United States Patent
Kramer

(10) Patent No.: US 12,400,127 B2
(45) Date of Patent: Aug. 26, 2025

(54) SYSTEM AND METHOD FOR CREATING A KNOWLEDGE GRAPH

(71) Applicant: TORCH RESEARCH, LLC, Leawood, KS (US)

(72) Inventor: Jon Kramer, Leawood, KS (US)

(73) Assignee: TORCH RESEARCH, LLC, Leawood, KS (US)

( * ) Notice: Subject to any disclaimer, the term of this patent is extended or adjusted under 35 U.S.C. 154(b) by 0 days.

(21) Appl. No.: 18/497,823

(22) Filed: Oct. 30, 2023

(65) Prior Publication Data

US 2024/0062076 A1     Feb. 22, 2024

Related U.S. Application Data

(63) Continuation of application No. 17/706,341, filed on Mar. 28, 2022, now Pat. No. 11,842,285.

(51) Int. Cl.
*G06N 5/02* (2023.01)
*G06F 16/901* (2019.01)

(52) U.S. Cl.
CPC ........... *G06N 5/02* (2013.01); *G06F 16/9024* (2019.01)

(58) Field of Classification Search
CPC .............................. G06N 5/02; G06F 16/9024
See application file for complete search history.

(56) References Cited

U.S. PATENT DOCUMENTS

| | | |
|---|---|---|
| 8,078,677 B2 | 12/2011 | Mendiola |
| 8,209,396 B1 | 6/2012 | Raman et al. |
| 9,317,566 B1 | 4/2016 | L'Huillier et al. |
| 11,487,932 B2 | 11/2022 | Kramer |
| 11,556,695 B2 | 1/2023 | Kramer |
| 11,734,493 B2 | 8/2023 | Kramer |
| 11,838,567 B2 | 12/2023 | Kramer |

(Continued)

OTHER PUBLICATIONS

Dessì, Danilo, et al. "Generating knowledge graphs by employing natural language processing and machine learning techniques within the scholarly domain." Future Generation Computer Systems 116 (2021): 253-264. (Year: 2021).*

(Continued)

*Primary Examiner* — Kevin W Figueroa
(74) *Attorney, Agent, or Firm* — Conley Rose, P.C.; Michael W. Piper; Elexis A. Jones

(57) ABSTRACT

A method for creating a graph database implemented knowledge mesh is disclosed. The method includes receiving, by a computer system, data from a plurality of different streams and identifying, by the computer system executing at least one machine learning model, a plurality of triples included in the data. The method also comprises filtering, by the computer system, the plurality of triples to identify a relevant subset of triples by applying an ontological filter, applying, by the computer system, a disambiguation routine to the relevant subset of triples to correlate entities included in the relevant subset to other entities in a graph database and determine a degree of confidence with each correlation, and creating, by the computer system, a knowledge mesh using the graph database. The knowledge mesh comprises the relevant subset of triples, each correlation identified by application of the disambiguation routine, and the degree of confidence with each correlation.

20 Claims, 4 Drawing Sheets

(56) References Cited

U.S. PATENT DOCUMENTS

| | | |
|---|---|---|
| 11,842,285 B2 | 12/2023 | Kramer |
| 2002/0143547 A1 | 10/2002 | Fay et al. |
| 2003/0016372 A1 | 1/2003 | Yeo et al. |
| 2003/0115219 A1 | 6/2003 | Chadwick |
| 2006/0173985 A1 | 8/2006 | Moore |
| 2008/0043144 A1 | 2/2008 | Amir et al. |
| 2012/0167103 A1 | 6/2012 | Kim et al. |
| 2013/0044955 A1 | 2/2013 | Hirai |
| 2013/0094834 A1 | 4/2013 | Laksono et al. |
| 2014/0289643 A1 | 9/2014 | Shmunis et al. |
| 2014/0358982 A1 | 12/2014 | Pareek et al. |
| 2015/0067006 A1 | 3/2015 | Miglore |
| 2015/0163561 A1 | 6/2015 | Grevers, Jr. |
| 2015/0378984 A1* | 12/2015 | Ateya ............... G06F 16/3344 707/769 |
| 2016/0357987 A1 | 12/2016 | Heo et al. |
| 2019/0311576 A1 | 10/2019 | Green et al. |
| 2019/0325259 A1 | 10/2019 | Murphy |
| 2019/0332658 A1 | 10/2019 | Heckel et al. |
| 2019/0384640 A1 | 12/2019 | Swamy et al. |
| 2020/0153928 A1 | 5/2020 | Chauhan et al. |
| 2020/0311616 A1 | 10/2020 | Rajkumar et al. |
| 2021/0192387 A1 | 6/2021 | Benson et al. |
| 2021/0256059 A1 | 8/2021 | Gan et al. |
| 2021/0271802 A1 | 9/2021 | Kramer |
| 2021/0273965 A1* | 9/2021 | Pi ..................... H04L 41/0631 |
| 2021/0279401 A1 | 9/2021 | Kramer |
| 2021/0279402 A1 | 9/2021 | Kramer |
| 2021/0279606 A1* | 9/2021 | Srinivasan ............... G06N 5/04 |
| 2023/0029096 A1 | 1/2023 | Kramer |
| 2023/0132243 A1 | 4/2023 | Mann et al. |

OTHER PUBLICATIONS

Dredze, Mark, et al. "Entity disambiguation for knowledge base population." Proceedings of the 23rd international conference on computational linguistics. 2010. (Year: 2010).*
Office Action dated Nov. 12, 2021, U.S. Appl. No. 16/805,302, filed Feb. 28, 2020.
Office Action dated Nov. 12, 2021, U.S. Appl. No. 17/326,812, filed May 21, 2021.
Office Action dated Nov. 23, 2021, U.S. Appl. No. 17/326,822, filed May 21, 2021.
Final Office Action dated Jun. 2, 2022, U.S. Appl. No. 16/805,302, filed Feb. 28, 2020.
Notice of Allowance dated Apr. 3, 2023, U.S. Appl. No. 16/805,302, filed Feb. 28, 2020.
Final Office Action dated Jun. 2, 2022, U.S. Appl. No. 17/326,812, filed May 21, 2021.
Notice of Allowance dated Oct. 25, 2022, U.S. Appl. No. 17/326,812, filed May 21, 2021.
Notice of Allowance dated Jun. 13, 2022, U.S. Appl. No. 17/326,822, filed May 21, 2021.
Notice of Allowance dated Jul. 22, 2022, U.S. Appl. No. 17/326,822, filed May 21, 2021.
Office Action dated Jun. 6, 2023, U.S. Appl. No. 17/384,413, filed Jul. 23, 2021.
Notice of Allowance dated Jul. 31, 2023, U.S. Appl. No. 17/384,413, filed Jul. 23, 2021.
Office Action dated Jul. 11, 2022, U.S. Appl. No. 17/706,341, filed Mar. 28, 2022.
Final Office Action dated Oct. 21, 2022, U.S. Appl. No. 17/706,341, filed Mar. 28, 2022.
Office Action dated Feb. 17, 2023, U.S. Appl. No. 17/706,341, filed Mar. 28, 2022.
Advisory Action dated Jan. 17, 2023, U.S. Appl. No. 17/706,341, filed Mar. 28, 2022.
Notice of Allowance dated Jul. 28, 2023, U.S. Appl. No. 17/706,341, filed Mar. 28, 2022.
Advisory Action dated Aug. 25, 2022, U.S. Appl. No. 16/805,302, filed Feb. 28, 2020.
Advisory Action dated Aug. 25, 2022, U.S. Appl. No. 17/326,812, filed May 21, 2021.
Dessi, Danilo, et al., "Generating knowledge graphs by employing natural language processing and machine learning echniques within the scholarly domain," Future Generation Computer Systems 116 (2021): 253-264. (Year: 2020).
Kramer, Jon, "Automated Dynamic Data Extraction, Distillation, and Enhancement", filed Oct. 31, 2023, Application No. 18/499,195.
Office Action dated May 14, 2024, U.S. Appl. No. 18/499,195, filed Oct. 31, 2023.
Final Office Action dated Oct. 10, 2024, U.S. Appl. No. 18/499,195, filed Oct. 31, 2023.

\* cited by examiner

SYSTEM AND METHOD FOR CREATING A KNOWLEDGE GRAPH

CROSS-REFERENCE TO RELATED APPLICATIONS

This application is a continuation of and claims priority under 35 U.S.C. § 120 to U.S. patent application Ser. No. 17/706,341 filed on Mar. 28, 2022, entitled "A Graph Database Implemented Knowledge Mesh" by Jon Kramer, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A relational database stores data in tables. The relational database approach is to define a schema for a table and then store only objects of that particular type within that table according to the defined schema. There are no defined relationships between tables stored in a relational database. Rather, relationships in a relational database are computed. In contrast to a relational database, a graph database writes the relationships and other data to disk without restriction to a predefined model or schema.

SUMMARY

In an embodiment, a method for creating a graph database implemented knowledge mesh is disclosed. The method comprises receiving, by a computer system, data from a plurality of different streams. The plurality of different streams comprises one or more of a text stream, an audio stream, a video stream, an image stream, or a custom stream. The data is enhanced by the inclusion of added attributes. The method also comprises identifying, by the computer system executing at least one machine learning (ML) model, a plurality of triples included in the data and filtering, by the computer system, the plurality of triples to identify a relevant subset of triples by applying an ontological filter to the plurality of triples. The method further comprises applying, by the computer system, a disambiguation routine to the relevant subset of triples to correlate entities included in the relevant subset of triples to other entities in a graph database and determine a degree of confidence with each correlation and creating, by the computer system, a knowledge mesh using the graph database. The knowledge mesh comprises knowledge mesh data including the relevant subset of triples, each correlation identified by application of the disambiguation routine, and the degree of confidence with each correlation.

In another embodiment, a system for creating a graph database implemented knowledge mesh is disclosed. The system comprises a graph database and a computer system comprising a non-transitory memory and a processor. The computer system is configured to receive data from a plurality of different streams. The plurality of different streams comprises one or more of a text stream, an audio stream, a video stream, an image stream, or a custom stream. The data is enhanced by the inclusion of added attributes. The computer system is also configured to identify, by executing at least one machine learning (ML) model, a plurality of triples included in the data and filter the plurality of triples to identify a relevant subset of triples by applying an ontological filter to the plurality of triples. The computer system is further configured to apply a disambiguation routine to the relevant subset of triples to correlate entities included in the relevant subset of triples to other entities in the graph database and determine a degree of confidence with each correlation and create a knowledge mesh using the graph database. The knowledge mesh comprises knowledge mesh data including the relevant subset of triples, each correlation identified by application of the disambiguation routine, and the degree of confidence with each correlation.

In yet another embodiment, a method for updating a graph database implemented knowledge mesh is disclosed. The method comprises receiving, by a computer system, data from a plurality of different sources. The data is enhanced by the inclusion of added attributes. The method also comprises identifying, by the computer system executing at least one machine learning (ML) model, a plurality of triples included in the data, filtering, by the computer system, the plurality of triples to identify a relevant subset of triples by applying an ontological filter to the plurality of triples, and determining, by the computer system, where to place each triple of the relevant subset of triples in a knowledge mesh data stored in a graph database. The knowledge mesh data comprises a plurality of layers. The determining where to place each triple in the knowledge mesh data comprises selecting a layer of the plurality of layers corresponding to the triple and identifying potential candidates related to each entity in the triple by parsing the layer. The method additionally comprises applying, by the computer system, a disambiguation routine, that evaluates the plurality of layers, to the relevant subset of triples to correlate entities included in the relevant subset of triples to other entities in the graph database including the potential candidates and determine a degree of confidence with each correlation. The method further comprise updating, by the computer system, the knowledge mesh data in the graph database to include the relevant subset of triples, each correlation identified by application of the disambiguation routine, and the degree of confidence with each correlation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
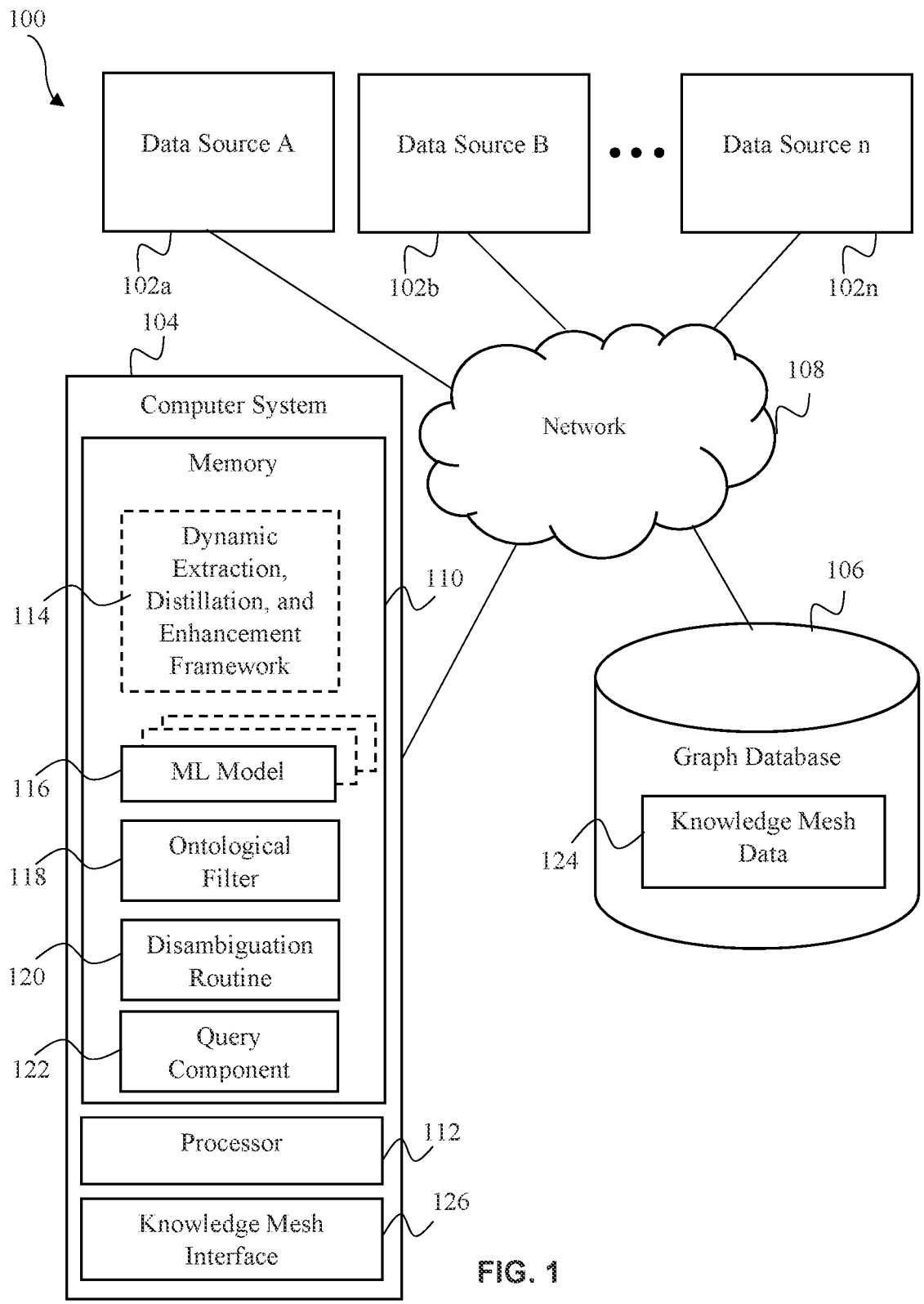
FIG. 1 is a block diagram of a system for creating a graph database implemented knowledge mesh according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Understanding data and the underlying relationships between the data can be a cumbersome challenge. To understand this challenge conceptually, take, for instance, this simple, non-limiting example—(1) there is a bank record of person x depositing 14 million dollars, (2) there are records of person y withdrawing 5 million dollars from a first account, 5 million dollars from a second account, and 4 million dollars from a third account, and (3) there is a video from a camera showing person x and person y meeting between when person x withdrew the money and person y deposited the money. Viewing the data from each data source individually, one cannot piece together the whole story. However, viewed as whole using the data from disparate data sources, one is able to piece together the story—person y gave person x 14 million dollars. However, there are technological challenges involved with implementing a system to effectively and efficiently determine relevant relationships between entities found in data from disparate data sources across different content types.

Part of understanding the data and the underlying relationships between the data involves disambiguation. Disambiguation is the process of distinguishing between similar things (e.g., entities such as persons). The traditional disambiguation approach includes fuzzy matching defined field. Fuzzy matching often involves manually deciding what fields to compare and how much tolerance to allow for discrepancies. This traditional disambiguation approach with its use of limited, defined fields is well suited for relational database structures because relational databases have defined schema. Relational databases store data in tables. However, there are no defined relationships between tables stored in a relational database. Instead, relationships in the relational database world have to be calculated, which is processor intensive and results in slower response times.

In contrast to the traditional disambiguation approach and its well suited use with relational databases, the pending application takes an open relationship based approach to understanding data that is well suited for a graph database, which allows for a more robust approach in a more processor efficient way because relationships are written to disk in graph databases. This results in faster response times with more insight because of reliance on the relationships at the core of the structure of graph databases. The open relationship based approach to understanding data disclosed herein stems from an open intelligence framework meaning that there is no restriction on the relationships or data types, which helps create more robust understanding of the data. The open, relationship based approach to understanding data disclosed herein includes analyzing and processing different types of data from multiple disparate data sources to produce a graph database implemented knowledge mesh that keeps track of people, places, businesses, currencies, things, and relationships that permeate all of the different authoritative data sources. The creation and storage of the knowledge mesh data enables the knowledge within the knowledge mesh to be accessed in real time to obtain complex answers timely within a scope of a query. The knowledge mesh data stored in the graph database may include relationships and/or other characteristics or source metadata connecting authoritative data with links to the actual authoritative data.

At any given time, relationships can be reevaluated via a knowledge mesh interface and application of various microservices and the knowledge mesh data updated, thereby resulting in a more up-to-date and accurate understanding of the data. The graph database implemented knowledge mesh may be comprised of the knowledge mesh interface, the various microservices discussed below, and the knowledge mesh data.

The process of creating the graph database implemented knowledge mesh may begin with data from data sources being processed by a dynamic extraction, distillation, and enhancement framework. Some of the data may be structured data while other data may be unstructured data such as new articles. The dynamic extraction, distillation, and enhancement framework separates the files received from the data sources into logical streams based on a native format of the file and creates enhanced data by adding attributes/metadata. The attributes/metadata added to the data may include characteristics of the data being processed (e.g., source, an identity of a person, a location, a topic, etc.) and/or relationships of the corresponding data within and between files. For more details on the dynamic extraction, distillation, and enhancement framework see U.S. application Ser. No. 17/384,413, filed Jul. 23, 2021, entitled "Automated Dynamic Data Extraction, Distillation, and Enhancement," by Jon Kramer, which is hereby incorporated by reference in its entirety.

One or more machine learning (ML) models may be applied to the enhanced data to identify triples. For example, the ML model(s) may include noun-verb-noun (NVN) extraction and/or subject-predicate-object (SPO) extraction. By leveraging the value add from the streams through use of the enhanced data, which includes the attributes/metadata, there is a more robust identification of triples. Additionally, use of the enhanced data (i.e., attributes/metadata) in dedicated streams enables more processor efficient identification of triples because the data has already been digested. The ML models used for NVN extraction and/or SPO extraction may vary depending on the type of data or dedicated stream (e.g., text, video, audio, image, custom, etc.). Triples may be identified expressly from the data or implied from the data and the associated metadata. The ML models used for NVN extraction and/or SPO extraction may be applied to the enhanced data in parallel to enable quicker identification of the triples.

The triples may be filtered by applying an ontology to identify a relevant subset triples. The ontology may define how things tend to interact. For example, the ontology may define that a person can be identified by a first name, last name, social security number, and/or another characteristic and the person can have a relationship type of "related to" another person or "employed by" a company. The ontology may define what triples should be kept and what triples should be filtered out. For example, for a given customer, the customer may have an ontology that defines that they only care about triples corresponding to an entity such as a person. In such an example, any other triples that do not include a person may be filtered out.

A disambiguation routine may be applied to the subset of triples that survive the ontological filter. The disambiguation routine may correlate similar things as well as determine a degree of confidence associated with the correlation. For example, if there are two John Smith's in different triples or there is already a John Smith stored in the system (e.g., in the knowledge mesh data), the disambiguation routine may evaluate how likely it is that the first John Smith is the same as the second John Smith. The disambiguation routine may consider associated contextual information (e.g., location, source, time, etc.) included as metadata with each of the triples. The disambiguation routine may be applied to the triples in-flight, at storage, or at query. If the disambiguation routine is applied at query, the context of the query may give a different, and perhaps advantageous, perspective on how to disambiguate.

The subset of triples is stored in a graph database to create a knowledge mesh data. The subset of triples may be represented in layers in the knowledge mesh data where each layer may correspond to a different stream of data (e.g., the text stream, the audio stream, the image stream, video stream, custom stream, etc.), a different data source, or a different type of source material (e.g., news articles, standard form 86s, etc.). One of the layers in the knowledge mesh data may correspond to a geography layer that includes geographical information associated with the triples. The knowledge layers in the knowledge mesh are used as a contextual overlay describing the interplay between underlying data sources.

In order to determine where in the knowledge mesh data a triple should be placed, a single layer or dimension may be initially selected and the non-relevant layers may initially be set aside. For example, if there is a person in the triple, all non-relevant layers such as for example the geography layer are initially set aside and a single layer is selected. The selected layer may be parsed to identify potential candidates related to each entity in the triple. For example, continuing with the John Smith example above, the selected layer is searched and all of the John Smiths from the selected layer are returned. By initially reducing the dimensionality of the knowledge layer by selecting and parsing a single layer to identify potential candidates, processing resources are saved. After the potential candidates from the selected layer are identified, all of the layers or dimensions of the knowledge mesh data may be evaluated by the disambiguation routine in combination with the potential candidates to determine and define the relationships.

The knowledge mesh data includes the relationships between entities in the triples and a degree of confidence corresponding to each relationship. The creation of the knowledge mesh data representing connections/relationships of entities and/or objects (e.g., person, place, thing, etc.) within various types of data and a confidence level associated with those connections/relationships may be created in flight, at the time of storage, or at query time depending on when the disambiguation routine is applied.

Within the knowledge mesh data, there may be intralayer relationships within a single layer and interlayer relationships between layers. The intralayer relationships may relate two entities within the same layer (e.g., multiple images with the two entities together or multiple articles that mention the two entities) while the interlayer relationships may relate two entities through different events (e.g., an image with the two entities together and an article that mentions the two entities). To maintain granularity, each entity from the triples may be represented separately in the knowledge mesh data and include the degrees of confidence that the entities are the same. For example, continuing with the John Smith example above, the knowledge mesh data may include a first element representing the first John Smith and a second element representing the second John Smith and indicate a relationship between the first John Smith and the second John Smith with a degree of confidence that the first John Smith and the second John Smith are the same John Smith. Regardless of the degree of confidence, the triples may be stored in the knowledge mesh data to continue to grow the overall knowledge especially since the degree of confidence may change over time as additional data/triples are processed.

For each entity represented in the knowledge mesh data, a recipe may be stored to enable an individual to access the original source document or article if needed and figure out how the disambiguation was performed. For example, the recipe for each entity may include a reference or link to the corresponding source document or article and the disambiguation instructions used to determine the relationships and degrees of confidence represented in the knowledge mesh data.

Turning to FIG. 1, a system 100 for creating a graph database implemented knowledge mesh is described. The system 100 may comprise a plurality of data sources 102a, 102b, and 102n, a computer system 104, a graph database 106, and a network 108. The network 108 promotes communication between the components of the system 100. The network 108 may be any communication network including a public data network (PDN), a public switched telephone network (PSTN), a private network, and/or a combination.

The data sources 102a, 102b, and 102n may be referred to as the data sources 102 below. The data sources 102 may comprise live, real-time data or older, stored data. The data sources 102 may comprise different types of data. The data received from the data sources 102 may be structured or unstructured. For example, the data may comprise news articles, news videos, other videos from cameras, standard form 86s, or other data. The data included in the data sources 102 may be in the form of data files or documents.

The computer system 104 may comprise at least one non-transitory memory 110 and at least one processor 112. The memory 110 may comprise a dynamic extraction, distillation, and enhancement framework 114, one or more ML models 116, an ontological filter 118, a disambiguation routine 120, and a query component 122. The computer system 104 may also comprise a knowledge mesh interface 126. Additional details regarding computer systems are discussed hereinafter with reference to FIG. 4.

In an embodiment, the computer system 104 executes the dynamic extraction, distillation, and enhancement framework 114. The dynamic extraction, distillation, and enhancement framework 114 may separate the files received from the data sources 102 into logical streams based on a native format of the file and create enhanced data by adding attributes/metadata. The logical streams may comprise a text stream, an image stream, a video stream, and an audio stream. The attributes/metadata added to the data may include characteristics of the data being processed (e.g., source, an identity of a person, a location, a topic, etc.) and/or relationships of the corresponding data within and between files. As discussed above, more details on the dynamic extraction, distillation, and enhancement framework can be found in U.S. application Ser. No. 17/384,413, filed Jul. 23, 2021, entitled "Automated Dynamic Data Extraction, Distillation, and Enhancement," by Jon Kramer, which is hereby incorporated by reference in its entirety.

The computer system 104 may execute one or more ML models 116 on the data received from the data sources 102 to identify triples. For example, the ML model(s) may include noun-verb-noun (NVN) extraction and/or subject-predicate-object (SPO) extraction. In an embodiment where the dynamic extract, distillation, and enhancement framework 114 enhances the data, the computer system 104 may execute one or more ML models 116 on the enhanced data. By leveraging the value add from the streams through use of the enhanced data, which includes the attributes/metadata, there is a more robust identification of triples. Additionally, use of the enhanced data (i.e., attributes/metadata) in dedicated streams enables more processor efficient identification of triples because the data has already been digested.

The ML model(s) 116 used for NVN extraction and/or SPO extraction may vary depending on the type of data or dedicated stream (e.g., text, video, audio, image, custom, etc.). For example, the NVN extraction ML model and/or SPO extraction ML model applied to text data may be different than the NVN extraction ML model and/or SPO extraction ML model applied to audio or video data. Additional ML model(s) may also be used to help identify triples. For example, there may be a person extractor ML model that extracts a person, a location extract ML model that extracts a location, a word embeddings ML model that creates clusters of related words, our other ML models that provide contextual distillation. The ML model(s) 116 may be updated over time as more data is processed by the computer system 104.

Triples may be identified expressly from the data. For example, triples can be determined explicitly from text of the document or file or converted text from video or audio by the dynamic extraction, distillation, and enhancement framework 114. Triples may be inherent or implied from the data. For instance, triples can be inherent or implied in the text based on metadata. In one non-limiting example, the source from the metadata may be used in a triple to leverage the distillation efforts performed by the dynamic extraction, distillation, and enhancement framework 114. Triples may be determined from video and/or audio based on analyzed data. For example, a video may be analyzed to determine that there was contact between two individuals. Triples may also be discarded based on analyzed video. For instance, a video may be analyzed to determine that there was no contact between two individuals. The ML models used for NVN extraction and/or SPO extraction may be applied to the data in parallel to enable quicker identification of the triples. Any data from the file or document that is not a triple may be indexed and stored.

After identifying the triples, the computer system 104 may filter the triples by applying the ontological filter 118 to identify a relevant subset of triples. The ontology or ontological filter 118 may define how things tend to interact. For example, the ontological filter 118 may define that a person can be identified by a first name, last name, social security number, and/or another characteristic and the person can have a relationship type of "related to" another person or "employed by" a company. For instance, the ontological filter 118 may define that <Person> <RelatedTo> <Person> is an acceptable relationship. If such is the case, when the ontological filter 118 is applied to the sentence "John Smith is Mike Smith's father," John Smith and Mike Smith will be identified as "Person" entities, but "RelatedTo" is not textually equal to "father." Thus, a semantic comparison (using multidimensional proximity analysis on word vectorization embeddings) may be performed to discern if "Father" and "RelatedTo" are semantically close. The threshold for semantically close may be configurable. The word embeddings ML model may be used for the semantic comparison. Continuing with the above example, if the semantic comparison determines that "Father" and "RelatedTo" are semantically close, the triple <John Smith> <Fathers> <Mike Smith> would pass the ontological filter 118.

The ontological filter 118 may define what triples should be kept and what triples should be filtered out. For example, for a given customer, the customer may have an ontology or ontological filter 118 that defines that they only care about triples corresponding to an entity such as a person. In such an example, any other triples that do not include a person may be filtered out. In some embodiments, the triples that are filtered out by the ontological filter 118 may be stored in a data store.

In an embodiment, the computer system 104 applies the disambiguation routine 120 to the subset of triples that survive the ontological filter 118. The disambiguation routine 120 may correlate similar things as well as determine a degree of confidence associated with the correlation. For example, if there are two John Smith's in different triples or there is already a John Smith stored in the graph database 106, the disambiguation routine 120 may evaluate how likely it is that the first John Smith is the same as the second John Smith. The disambiguation routine 120 may consider associated contextual information (e.g., location, source, time, etc.) included as metadata with each of the triples. The disambiguation routine 120 may be applied to the triples in-flight, at storage, or at query. If the disambiguation routine 120 is applied in response to a query from the query component 122, the context of the query may give a different, and perhaps advantageous, perspective on how to disambiguate.

The various microservices (e.g., the ML model(s) 116, the ontological filter 118, and the disambiguation routine 120) are performed on data outside of the graph database 106. For example, if the disambiguation routine 120 is performed at query time, the knowledge mesh interface 126 may pull relevant knowledge mesh data 124 from the graph database 106, temporarily cache the relevant knowledge mesh data 124 in a non-transitory memory (such as the non-transitory memory 110) so that the disambiguation routine 120 can be applied to it, and then commit the determined knowledge back to the graph database 106.

The computer system 104 may store the subset of triples in the graph database 106 to create knowledge mesh data 124. The knowledge mesh data 124 stored in the graph database 106 may be a n-dimensional data structure. The subset of triples may be represented in layers in the knowledge mesh data 124 where each layer may correspond to a different stream of data (e.g., the text stream, the audio stream, the image stream, video stream, custom stream, etc.), a different data source, or a different type of source material (e.g., news articles, videos of interviews, standard form 86s, etc.). One of the layers in the knowledge mesh data 124 may correspond to a geography layer that includes geographical information associated with the triples. The knowledge layers in the knowledge mesh data 124 are used as a contextual overlay describing the interplay between underlying data sources.

In order to determine where in the knowledge mesh data 124 a triple should be placed, the computer system 104 may initially selects a single layer or dimension of the knowledge mesh data 124 and disregard the non-relevant layers. For example, if there is a person in the triple, all non-relevant layers such as for example the geography layer are initially set aside and a single layer is selected. The selected layer may be parsed to identify potential candidates related to each entity in the triple. For example, continuing with the John Smith example above, the selected layer is searched and all of the John Smiths from the selected layer are returned. By initially reducing the dimensionality of the knowledge layer by selecting and parsing a single layer to identify potential candidates, processing resources are saved. If no potential candidates are identified for a triple, the triple may be stored in the selected layer of the knowledge mesh data 124. In some cases, the knowledge mesh data 124 may initially store triples without any relationships or degrees of confidence until the disambiguation routine 120 is applied.

After the potential candidates from the selected layer are identified, the computer system 104 may evaluate all of the layers or dimensions of the knowledge mesh data 124 using the disambiguation routine 120 in combination with the potential candidates to determine and define the relationships. For instance, the disambiguation routine may determine that it is 90% confident that the John Smith in the triple is the same as a first John Smith in the knowledge mesh data 124 and 60% confident that the John Smith in the triple is the same as a second John Smith in the knowledge mesh data 124.

The knowledge mesh data 124 may be created at varying levels of detail. In an embodiment, the knowledge mesh data 124 includes the relationships between entities in the triples and a degree of confidence corresponding to each relationship. The creation of the knowledge mesh data 124 representing connections/relationships of entities and/or objects (e.g., person, place, thing, etc.) within various types of data and a confidence level associated with those connections/relationships may be created in flight, at the time of storage, or at query time depending on when the disambiguation routine 120 is applied. The knowledge mesh data 124 may also store the source for each triple to enable an individual to revert to the original source of the data.

Within the knowledge mesh data 124, there may be intralayer relationships within a single layer and interlayer relationships between layers. The intralayer relationships may relate two entities within the same layer (e.g., multiple images with the two entities together or multiple articles that mention the two entities) while the interlayer relationships may relate two entities through different events (e.g., an image with the two entities together and an article that mentions the two entities). To maintain granularity, each entity from the triples may be represented separately in the knowledge mesh data 124 and include the degrees of confidence that the entities are the same. For example, continuing with the John Smith example above, the knowledge mesh data 124 may include a first element representing the first John Smith and a second element representing the second John Smith and indicate a relationship between the first John Smith and the second John Smith with a degree of confidence that the first John Smith and the second John Smith are the same John Smith. Regardless of the degree of confidence, the triples may be stored in the knowledge mesh data 124 to continue to grow the overall knowledge especially since the degree of confidence may change over time as additional data/triples are processed.

For each entity represented in the knowledge mesh data 124, a recipe may be stored to enable an individual to access the original source document or article if needed and figure out how the disambiguation routine 120 was performed. For example, the recipe for each entity may include a reference or link to the corresponding source document or article and the disambiguation routine 120 used to determine the relationships and degrees of confidence represented in the knowledge mesh data 124.

Customers may interact with the knowledge mesh data 124 via the knowledge mesh interface 126 as opposed to directly interacting with the graph database 106. In an embodiment, the combination of knowledge mesh data 124, the knowledge mesh interface 126, and the application of the various microservices (e.g., the ML model(s) 116, the ontological filter 118, and the disambiguation routine 120) make-up the graph database implemented knowledge mesh.

The open relationship based approach to disambiguation, which leverages the enhanced data (e.g., the attributes/metadata), enables a more robust approach in a more processor efficient way because the data from the disparate data sources is already distilled. Further, the use of the graph database 106 is advantageous in that it is leaner than a relational database and the relationships identified by the disambiguation routine 120 are written to disk in the graph database 106 as opposed to computed as is the case with a relational database, which results in faster response times to queries from the query component 122 with more insight because of reliance on the relationships at the core of the structure of the graph database 106.

Figure 2:
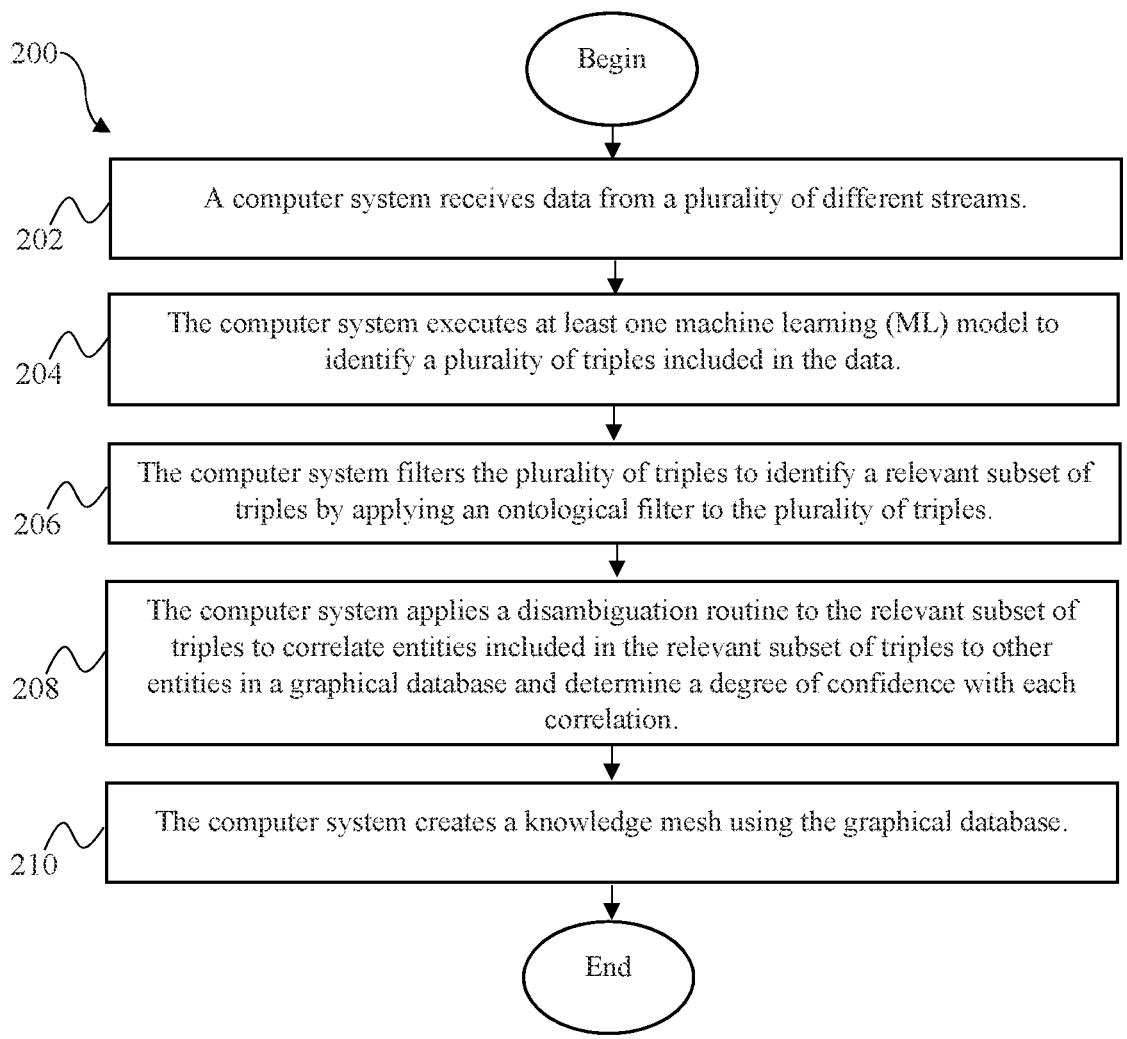
FIG. 2 is a flow chart of a method according to an embodiment of the disclosure.

Turning now to FIG. 2, a method 200 for creating a graph database implemented knowledge mesh is described. At block 202, a computer system (e.g., computer system 104) receives data from a plurality of data streams. The plurality of different streams may comprise one or more of a text stream, an audio stream, a video stream, and an image stream. The data may be enhanced by the inclusion of added attributes. The plurality of different text streams and the enhanced data may be created by a dynamic extraction, distillation, and enhancement framework (e.g., dynamic extraction, distillation, and enhancement framework 114). At block 204, the computer system executes at least one machine learning (ML) model (e.g., ML model 116) to identify a plurality of triples included in the data.

At bock 206, the computer system filters the plurality of triples to identify a relevant subset of triples by applying an ontological filter (e.g., ontological filter 118) to the plurality of triples. At block 208, the computer system applies a disambiguation routine (e.g., disambiguation routine 120) to the relevant subset of triples to correlate entities included in the relevant subset of triples to other entities in a graph database (e.g., graph database 106) and determine a degree of confidence with each correlation. At block 210, the computer system creates a knowledge mesh (e.g., knowledge mesh 124) using the graph database. In an embodiment, the knowledge mesh comprises the relevant subset of triples, each correlation identified by application of the disambiguation routine, and the degree of confidence with each correlation.

Figure 3:
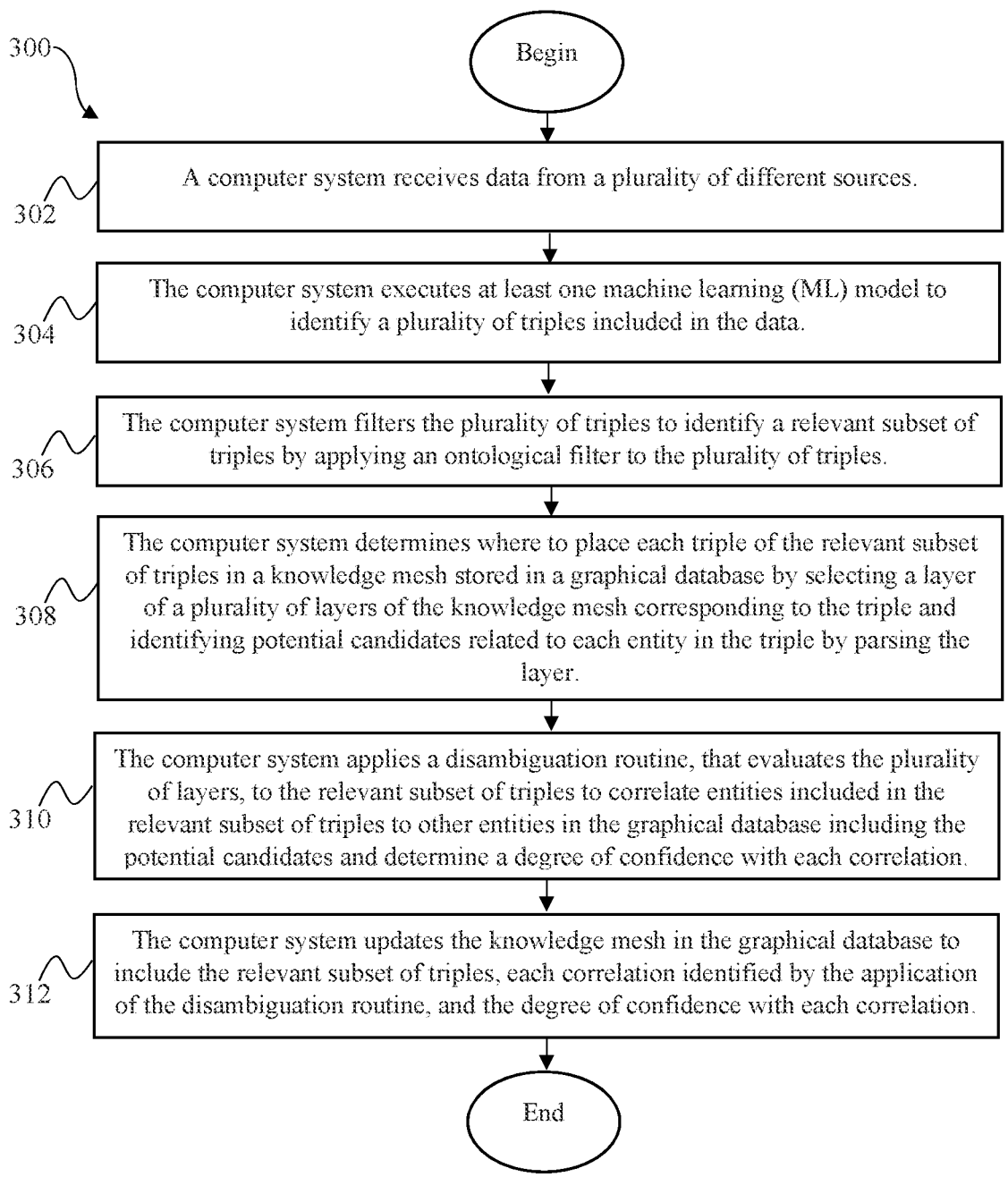
FIG. 3 is a flow chart of a method according to an embodiment of the disclosure.

Turning now to FIG. 3, a method 300 for updating a graph database implemented knowledge mesh is described. At block 302, a computer system (e.g., computer system 104) receives data from a plurality of different sources (e.g., data sources 102). The data is enhanced by the inclusion of added attributes. At block 304, the computer system executes at least one machine learning (ML) model (e.g., ML model 116) to identify a plurality of triples included in the data. At bock 306, the computer system filters the plurality of triples to identify a relevant subset of triples by applying an ontological filter (e.g., ontological filter 118) to the plurality of triples.

At block 308, the computer system determines where to place each triple of the relevant subset of triples in a knowledge mesh data (e.g., knowledge mesh data 124) stored in a graph database (e.g., graph database 106) by selecting a layer of a plurality of layers of the knowledge mesh data corresponding to the triple and identifying potential candidates related to each entity in the triple by parsing the layer. At block 310, the computer system applies a disambiguation routine, that evaluates the plurality of layers, to the relevant subset of triples to correlate entities included in the relevant subset of triples to other entities in the graph database including the potential candidates and determine a degree of confidence with each correlation. At block 312, the computer system updates the knowledge mesh data in the graph database to include the relevant subset of triples, each correlation identified by the application of the disambiguation routine, and the degree of confidence with each correlation.

Figure 4:
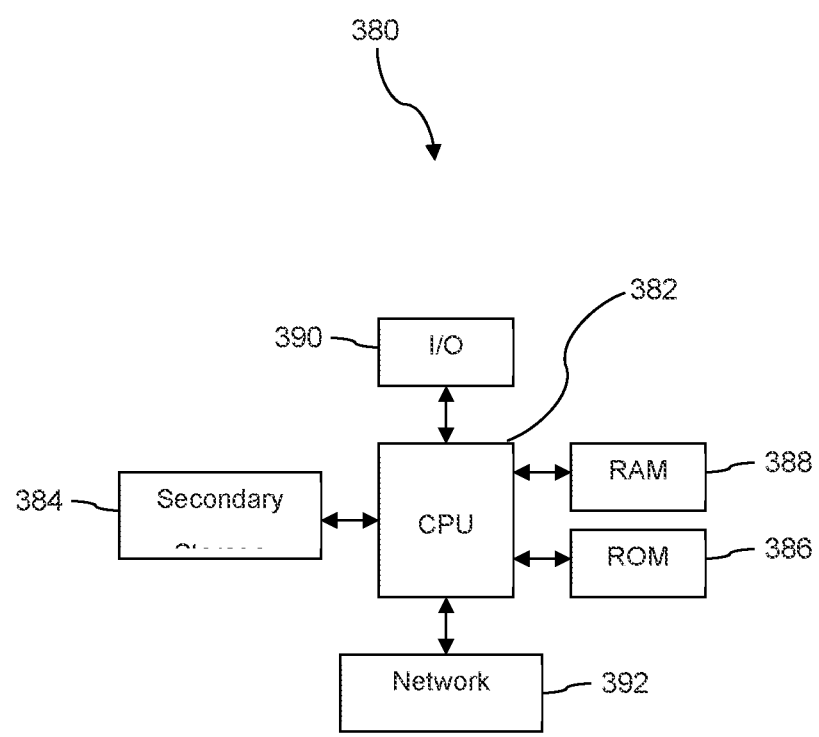
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the context of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for creating a knowledge graph, comprising:
receiving, by a computer system, data of a plurality of different content types from a plurality of different streams, wherein the plurality of different streams comprises one or more of a text stream, an audio stream, a video stream, an image stream, or a custom stream, and wherein the data is enhanced by the inclusion of added attributes about the data being processed thereby creating enhanced data in each stream of the plurality of streams;

for a first stream of the plurality of different streams, identifying, by the computer system executing at least a first machine learning (ML) model, a first plurality of triples included in the enhanced data of the first stream;

for a second stream of the plurality of different streams, identifying, by the computer system executing at least a second ML model, a second plurality of triples included in the enhanced data of the second stream, wherein the first ML model and the second ML model are different based on the different content type of the data in the first stream compared to the second stream;

filtering, by the computer system, the first plurality of triples and the second plurality of triples to identify a relevant subset of triples by applying a customer defined ontological filter to the plurality of triples, wherein applying the customer defined ontological filter comprises performing a semantic comparison between at least a portion of the ontological filter and at least a portion of one or more of the plurality of triples, and wherein the customer defined ontological filter refines the plurality of triples with customer defined parameters to identify the relevant subset of triples;

applying, by the computer system, a disambiguation routine to the relevant subset of triples to correlate entities included in the relevant subset of triples to other entities and to determine a degree of confidence that correlated entities are the same entity; and creating, by the computer system, a knowledge graph, wherein the knowledge graph comprises data including the relevant subset of triples, each correlation identified by application of the disambiguation routine, and the degree of confidence with each correlated entity.

2. The method of claim 1, wherein the first ML model or the second ML model comprise at least one of a noun-verb-noun extraction or a subject-predicate-object ML extraction.

3. The method of claim 1, wherein at least some of the triples are expressly identified from the data and at least some of the triples are impliedly identified from the data and the attributes added to the data.

4. The method of claim 1, wherein the attributes added to a corresponding data comprise characteristics of the corresponding data, and wherein the characteristics comprise one or more of a source of the corresponding data, an identity of a person in the corresponding data, a location in the corresponding data, a time in the corresponding data, or a topic associated with the corresponding data.

5. The method of claim 1, wherein the customer defined ontological filter defines that any triples comprising a person be included in the relevant subset of triples.

6. The method of claim 1, wherein the disambiguation routine uses one or more of the attributes added to the data.

7. The method of claim 1, wherein the disambiguation routine is applied to the relevant subset of triples in flight, at storage of a relevant triple, or responsive to receipt of a query.

8. The method of claim 1, wherein the data in the knowledge graph comprises a plurality of dimensions, and wherein at least some of the plurality of dimensions correspond to a different stream of data, a different data source, or a different type of source material.

9. The method of claim 8, wherein the data in the knowledge graph comprises intra-dimensional relationships between entities represented in a single dimension and interdimensional relationships between entities represented in different dimensions.

10. The method of claim 1, further comprising creating and storing a recipe for each entity represented in the data in the knowledge graph, wherein the recipe for each entity comprises a link to a corresponding source data and corresponding disambiguation instructions used to determine any relationships and degrees of confidence associated with the entity.

11. The method of claim 1, wherein the plurality of data streams comprise a text stream, an audio stream, a video stream, and an image stream, and wherein the different content types comprise text in the text stream, audio in the audio stream, video in the video stream, and images in the image stream.

12. A system for creating a knowledge graph, comprising:
a computer system comprising:
a non-transitory memory; and
a processor, wherein the computer system is configured to:
receive data of a plurality of different content types from a plurality of different streams, wherein the plurality of different streams comprises one or more of a text stream, an audio stream, a video stream, an image stream, or a custom stream, and wherein the data is enhanced by the inclusion of added attributes about the data being processed thereby creating enhanced data in each stream of the plurality of streams, for a first stream of the plurality of different streams, identify, by executing at least a first machine learning (ML) model, a first plurality of triples included in the enhanced data of the first stream, for a second stream of the plurality of different streams, identify, by the computer system executing at least a second ML model, a second plurality of triples included in the enhanced data of the second stream, wherein the first ML model and the second ML model are different based on the different content type of the data in the first stream compared to the second stream, filter the first plurality of triples and the second plurality of triples to identify a relevant subset of triples by applying a customer defined ontological filter to the plurality of triples, wherein applying the customer defined ontological filter comprises performing a semantic comparison between at least a portion of the ontological filter and at least a portion of one or more of the plurality of triples, and wherein the customer defined ontological filter refines the plurality of triples with customer defined parameters to identify the relevant subset of triples, apply a disambiguation routine to the relevant subset of triples to correlate entities included in the relevant subset of triples to other entities and determine a degree of confidence that correlated entities are the same entity, and create a knowledge graph, wherein the knowledge graph comprises data including the relevant subset of triples, each correlation identified by application of the disambiguation routine, and the degree of confidence with each correlated entity.

13. The system of claim 12, wherein the first ML model or the second ML model comprise at least one of a noun-verb-noun extraction or a subject-predicate-object ML extraction.

14. The system of claim 12, wherein the computer system is further configured to create and store a recipe for each entity represented in the data in the knowledge graph, wherein the recipe for each entity comprises a link to a corresponding source data and corresponding disambiguation instructions used to determine any relationships and degrees of confidence associated with the entity.

15. The system of claim 12, wherein the attributes added to a corresponding data comprise characteristics of the corresponding data, and wherein the characteristics comprise one or more of a source of the corresponding data, an identity of a person in the corresponding data, a location in the corresponding data, a time in the corresponding data, or a topic associated with the corresponding data.

16. The system of claim 15, wherein at least some of the triples are expressly identified from the data and at least some of the triples are impliedly identified from the data and the attributes added to the data.

17. The system of claim 16, wherein the disambiguation routine uses one or more of the attributes added to the data.

18. The system of claim 12, wherein the data in the knowledge graph comprises a plurality of dimensions, and wherein at least some of the plurality of dimensions correspond to a different stream of data, a different data source, or a different type of source material.

19. The system of claim 12, wherein the data in the knowledge graph comprises intra-dimensional relationships between entities represented in a single dimension and interdimensional relationships between entities represented in different dimensions.

20. The system of claim 12, wherein the customer defined ontological filter defines that any triples comprising a person be included in the relevant subset of triples.

* * * * *